UNITED STATES PATENT OFFICE.

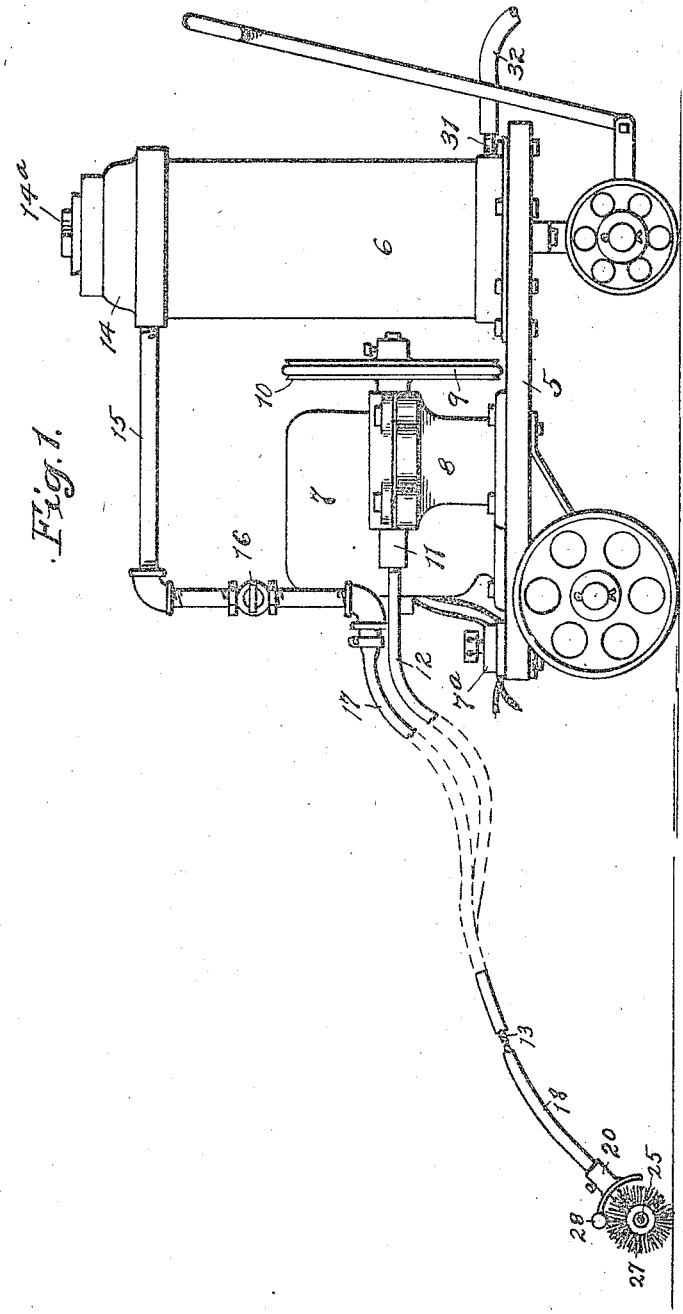

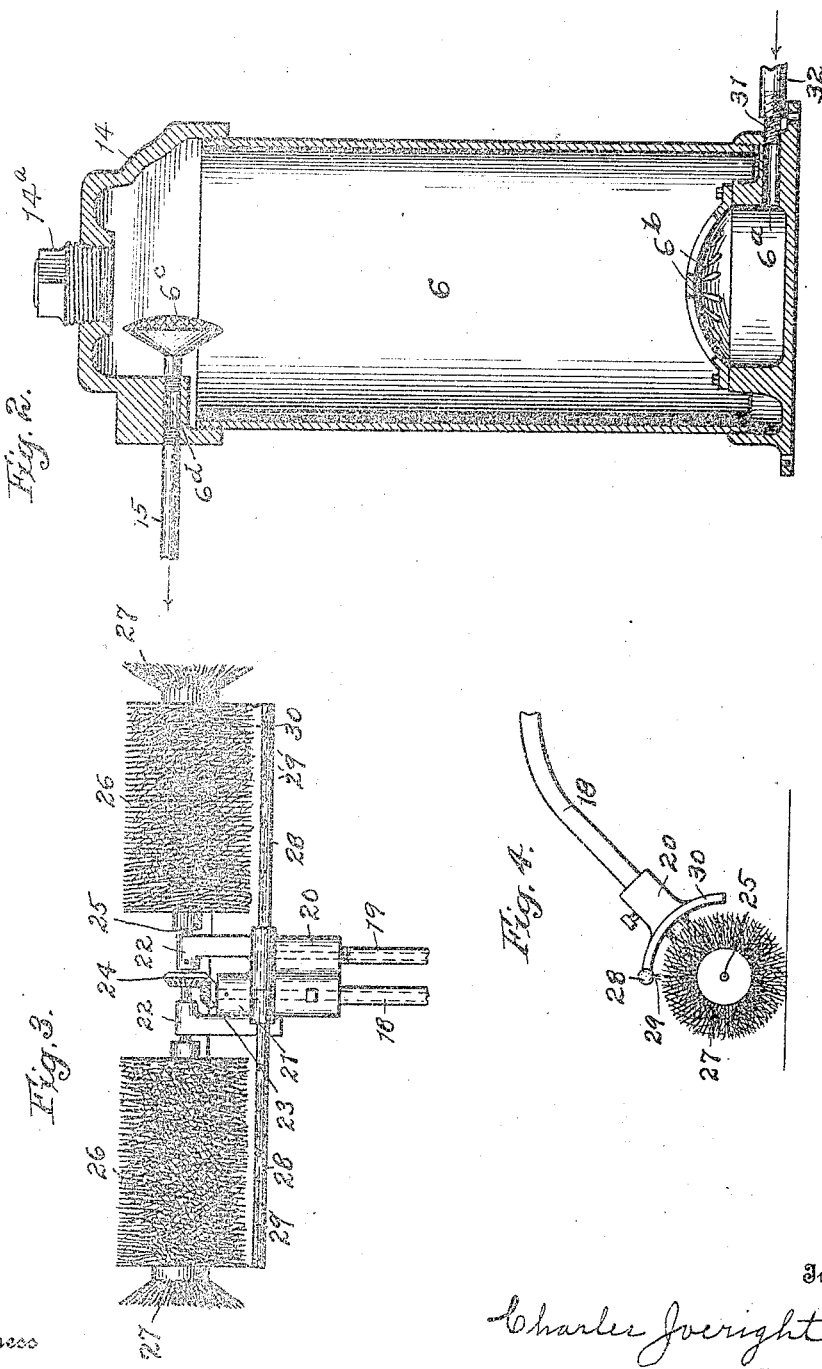

CHARLES JOERIGHT, OF CHAGRIN FALLS, OHIO.

SCRUBBING-MACHINE 1,182,489. Specification of Letters Patent. Patented May 9, 1916.

Application filed August 3, 1915. Serial No. 43,390.

*To all whom it may concern:*

Be it known that I, CHARLES JOERIGHT, a citizen of the United States, residing at Chagrin Falls, in the county of Cuyahoga and State of Ohio, have invented certain new and useful Improvements in Scrubbing-Machines, of which the following is a specification.

This invention relates to scrubbing machines of the fountain type, and comprises a machine having a tank for mixing soap and water, supplied with water under pressure, and with a pipe leading from the tank to a rotary brush which operates on the floor or other surface to be scrubbed and which is driven by a motor, the tank and motor being mounted on a truck.

The invention is illustrated in the accompanying drawings in which—

Figure 1 is a side view of the machine. Fig. 2 is a vertical section of the tank. Fig. 3 is a plan of the brush. Fig. 4 is a side view of the brush.

Referring specifically to the drawings, 5 indicates a wheeled truck on which is mounted a tank 6 supplied with water through a hose 32 which may be connected to any suitable faucet. The hose is connected by a nipple 31 to an inlet 6ᵃ at the bottom of the tank, the inlet opening being covered by a grating 6ᵇ which supports the soap and distributes the water. The tank has a cover 14, with a removable plug 14ᵃ through which soap may be placed in the tank. A strainer 6ᶜ, in the top of the tank, excludes the soap from the outlet passage 6ᵈ which is connected by a pipe 15 and hose 17 to the brush. The pipe has a valve 16 to control the flow. The hose 17 is connected to a pipe section 19 held by a fitting 20 with passages leading to branch pipes 28 which have openings 29 discharging on to the brushes 26. These brushes are mounted on a shaft 25 carried by bearing arms 22 projecting from the fitting 20. Brushes 27 are provided at the ends of the shaft to operate on wash boards.

The shaft 25 has a bevel gear 24 which meshes with a bevel gear 23 on the end of a flexible shaft 13 which extends through tubular casings 12 and 18, the shaft having a bearing in the fitting 20 and extension 21 thereof, at one end, and being connected at the other end to a shaft 11 mounted on a bearing block 8 on the truck and having a fly wheel 10 driven by a belt 9 from an electric motor 7 which is controlled by a switch 7ᵃ.

In use, soap is placed in the tank and water is forced in to form a suds which is delivered through the pipe 15 and other connections to the brushes which are rotated by the driving connections to the motor. The truck may be moved about from place to place, and the brushes manipulated to scrub the floor. The machine will be found particularly useful in buildings having large floor areas with water and electric connections, but is adapted for house and other uses. As the water is forced through the tank it agitates the soap, providing a continuous supply of suds to the brushes.

What I claim as new is:

In a scrubbing machine, the combination of a fitting having oppositely extending pipes provided with outlets along the same, a brush shaft having a bearing at the middle part thereof in the fitting and provided with brushes at opposite ends extending along beside said pipes in position for the brushes to receive water therefrom, a water supply hose connected to the fitting, and a flexible drive shaft extending at an angle to the brush shaft and having a bearing in the fitting and geared to the brush shaft between the ends thereof.

In testimony whereof, I affix my signature in presence of two witnesses.

CHARLES JOERIGHT.

Witnesses.
GEORGE S. LAUDER,
J. R. ROBINSON.